Aug. 28, 1951  H. M. REEVES  2,566,033
SPACE HEATER
Filed Oct. 19, 1946  3 Sheets-Sheet 1
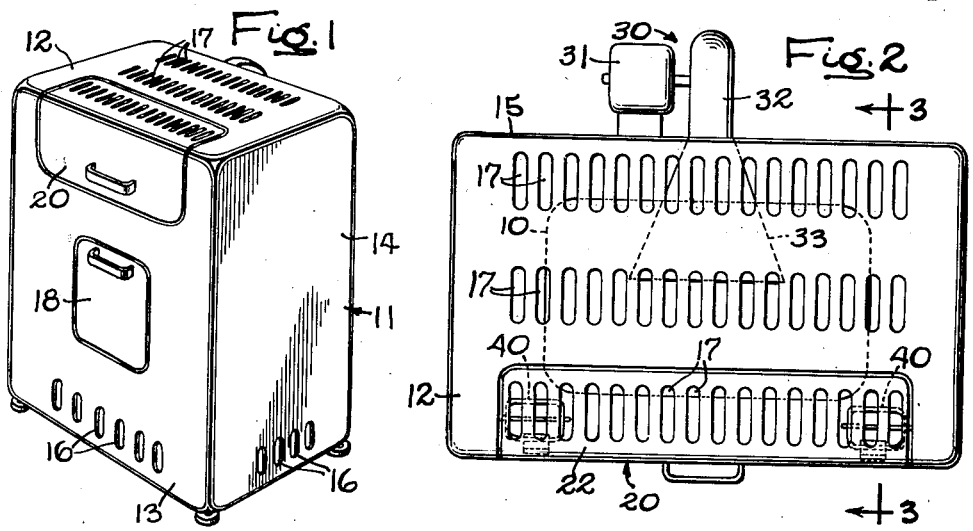
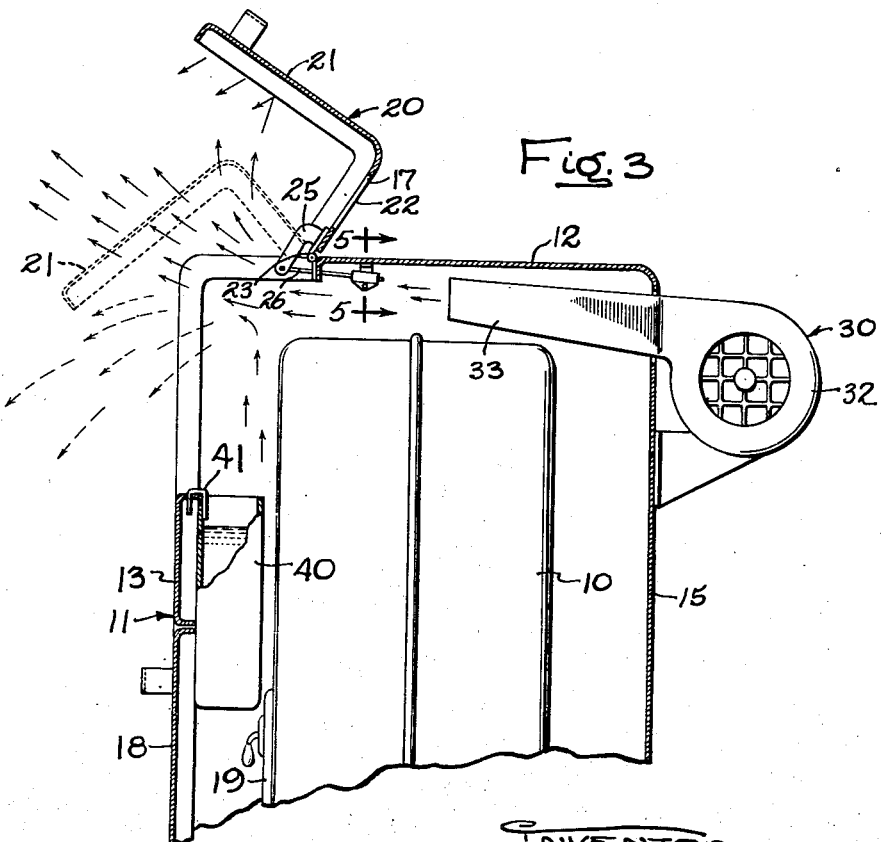
INVENTOR
Herbert M. Reeves
By [signature]
ATTORNEYS Aug. 28, 1951  H. M. REEVES  2,566,033
SPACE HEATER
Filed Oct. 19, 1946  3 Sheets-Sheet 2
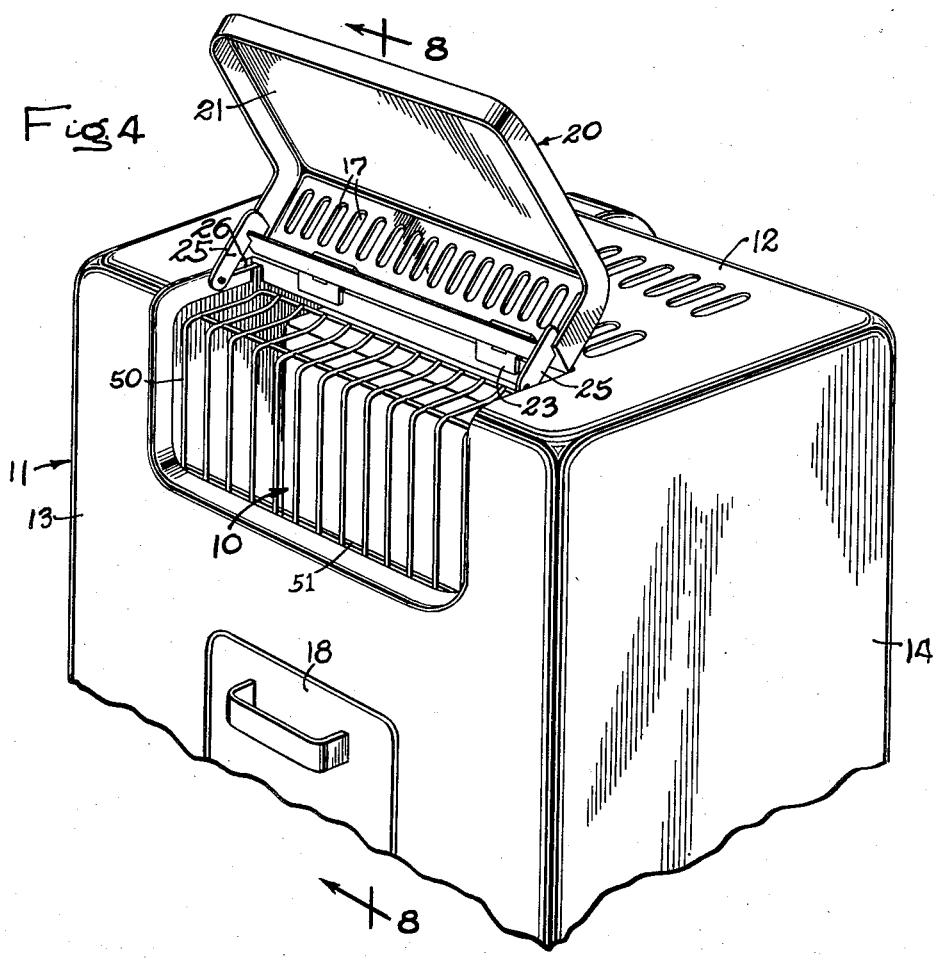
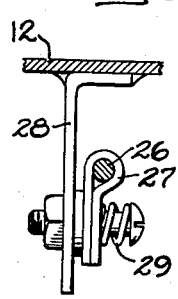
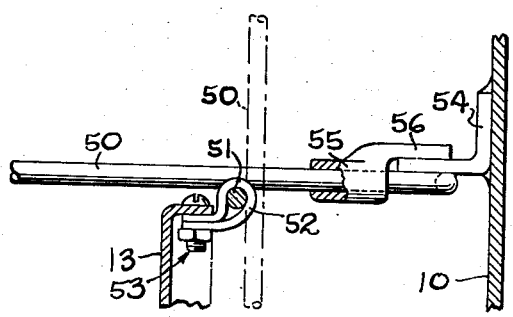
INVENTOR
Herbert M. Reeves
ATTORNEYS Aug. 28, 1951  H. M. REEVES  2,566,033
SPACE HEATER
Filed Oct. 19, 1946  3 Sheets-Sheet 3
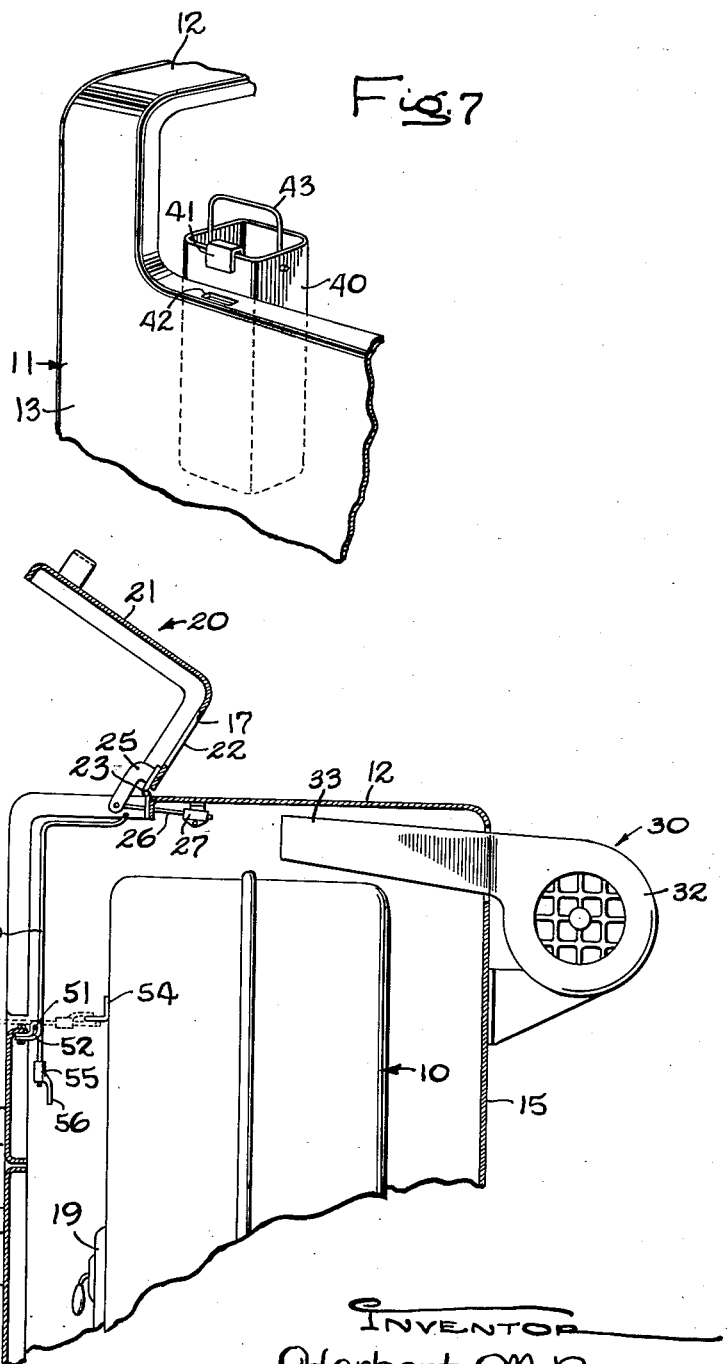
INVENTOR
Herbert M. Reeves
By [signature]
ATTORNEYS Patented Aug. 28, 1951

2,566,033

UNITED STATES PATENT OFFICE 2,566,033

SPACE HEATER

Herbert M. Reeves, Kankakee, Ill., assignor to Florence Stove Company, Gardner, Mass., a corporation of Massachusetts Application October 19, 1946, Serial No. 704,469

2 Claims. (Cl. 98—40)

The present invention pertains to space heaters of the cabinet type and comprising an inner heating unit and an outer casing enclosing the heating unit. Heaters of this type are commonly referred to as circulating heaters in that air is drawn into the casing at its bottom for passage upwardly around the heating unit and is discharged at the top. Thus the heater sets up a circulation of air in the room or space to be heated and has the effect of distributing heated air to points remote from the heater.

Heretofore the result of such operation has been that when the room or other space to be heated is cool a substantial amount of time is required for the heater to raise the room temperature to the desired degree. Furthermore, the lower region of the room or space to be heated and, incidentally, that most likely to be occupied, remains the coolest and requires the longest time to have its temperature raised the desired amount.

The primary object of the instant invention is to provide a heater of the general character indicated which is so constructed and arranged as to cause deflection of the heated air in a direction such that the temperature of the space adjacent the heater and the lower region of the space to be heated, may when desired, be raised with substantially greater rapidity than the upper and more remote regions.

A more specific object of the invention lies in the provision of an adjustable deflector door by means of which a portion of the inner heating unit can be directly exposed and which is so positioned as to act on the upwardly rising current of heated air to direct it as desired.

A further object of the invention is to provide a blower means which is operable in conjunction with the aforesaid deflector door to control the distribution of heated air from the heater.

Another object is to provide a grille structure which is adapted to serve both as a guard to prevent accidental contact with the inner heating unit and as a warming and drying rack.

A still further object of the invention is to provide in a space heater humidifying pans of large volume and positioned to permit of ready removal for cleaning and refilling.

The objects of the invention thus generally set forth, together with other and ancillary advantages, are attained by the construction and arrangement shown by way of illustration in the accompanying drawings, in which:

Figure 1 is a perspective view of a space heater embodying the invention.

Fig. 2 is a plan view on a somewhat larger scale of the heater shown in Figure 1.

Fig. 3 is a sectional side elevation on an enlarged scale taken substantially along the line 3—3 of Fig. 2.

Fig. 4 is a fragmentary perspective view of the heater with the deflector door open showing the grille in upright position.

Fig. 5 is a fragmentary sectional view of the deflector door holding means taken substantially along the line 5—5 of Fig. 3.

Fig. 6 is a detailed sectional elevation of the grille hinge and latch means.

Fig. 7 is a fragmentary perspective view showing the mounting of a humidifier pan.

Fig. 8 is a sectional side elevation taken substantially along the line 8—8 of Fig. 4.

While the invention is susceptible of various modifications and alternative constructions, there is shown in the drawings and will herein be described in detail the preferred embodiment, but it is to be understood that it is not intended thereby to limit the invention to the form disclosed but it is intended to cover all modifications and alternative constructions falling within the spirit and scope of the appended claims.

Referring more particularly to the exemplary embodiment of the invention as illustrated in the drawings, the heater there shown comprises an inner heating unit 10 enclosed within a generally rectangular cabinet structure 11 having a top wall 12 and vertical side walls including a front wall 13, end walls 14 and a back wall 15. The front and end walls are provided with a series of openings 16 adjacent their bottoms for admission of air, and there are several rows of elongated openings 17 in the top 12 through which heated air is discharged. The walls 13, 14 and 15 are spaced laterally from the inner heating unit 10 and normally serve to direct air currents upwardly around the heating unit for discharge through the openings 17 and the top 12. Accordingly, air is drawn into the heater through the openings 16, passes upwardly through the casing and discharges at the top for circulation to the remote portions of the room or other space to be heated. Access to the inner heating unit 10 is had by way of a door 18 in the front wall 13 of the cabinet structure which is positioned immediately in front of a door 19 in the inner heating unit 10.

Owing to the fact that the heated air tends to remain in the upper region of the room, the lower region has a tendency to remain cool. For the purpose of raising the temperature of the lower region of the room and the space adjacent the heater with substantially greater rapidity certain portions of the cabinet structure 11 are constructed to permit of direct exposure of the heating unit 10, and to deflect the rising air currents about the heating unit outwardly and downwardly from the top of the heater. To this end portions of the front wall 13 and top 12 are movable to directly expose the heating unit 10. More particularly, substantial portions of the top 12 and the front wall 13 are made in the form of a single door 20, movable as a unit to an open position in which the heating unit 10 is partially exposed. At the same time, the door 20 is so constructed and arranged as to constitute an adjustable deflector for the heated air.

The deflector door 20 is substantially L-shaped in cross section and comprises a forward section 21 and a top section 22, each of which has its edges turned inwardly at right angles to the main surface to provide greater strength for the door structure.

The door 20 is pivotally mounted on hinges 23 which are fixed to the rear edge of the top section 22 and to the top wall 12 (Figs. 3 and 4). To adjustably position the door so that the currents of heated air can be deflected in any desired direction, a yieldable holding means is provided. In the present instance this holding means includes arms 25 fixed adjacent the rear of the outer edges of the top section 22 and extend beyond and parallel to the plane of the section 22. In the ends of these arms 25 are pivotally fastened the ends of rods 26 which extend rearwardly and are inserted through frictional clamping members 27. As will be seen by reference to Fig. 5, the members 27 are suitably supported on brackets 28 that depend from the under surface of the top 12. Adequate frictional holding pressure is afforded to the members 27 by means of springs 29.

The continuous plane surface of the forward section 21 of the deflector door 20 is adapted to reflect heat and deflect the currents of heated air. To insure that a substantial amount of heated air will be deflected, the top section 22 is made to extend inwardly into the top wall 12, including the first row of openings 17, beyond the flue space between the front wall 13 and the inner heating unit 10, whereby all of the heated air flowing upwardly from the space will be acted on by the forward section 21 when the door is in opened position.

To augment the supply of heated air to the lower region of the room through the opening left by the door 20, a blower 30 may be positioned near the top of the back wall 15. This blower 30 may be of any conventional form. As shown it comprises a drive motor 31, an impeller section 32 and has a flared discharge duct 33 extending through the back wall 15 into the space between the top of the heating unit 10 and the top wall 12 and having its discharge opening directed toward the opening left by the door 20.

In space heaters it is particularly desirable to provide means for imparting additional moisture to the heated air. Heretofore containers for water have been placed in the flue spaces and usually permanently fixed to the back wall of the outer casing or, in instances where such containers have been made removable because of space limitations, they have necessarily been of small capacity. In the preferred embodiment of the present invention humidifier pans 40 are removably positioned adjacent the front wall 13 of the outer casing 11 in the flue space on either side of the access doors 18 and 19. Each pan 40 is supported by an inverted U-shaped member 41 which has one of its legs fixed to the pan and the other leg adapted to be inserted in an opening 42 formed in the inturned flange of the front wall at the door opening (Figs. 3 and 7). By so placing the pans 40 they can be made of comparatively large volume, since their removal can be effected by way of the opening left by the door 20. To facilitate this removal the pans 40 are provided with handles or bails 43.

To prevent accidental touching of the inner heating unit 10 when the deflector door 20 is opened protective means is provided. In the present instance this protective means is in the form of a plurality of substantially L-shaped bars or rods fashioned into a grille 50 which is positioned within the outer casing 11 across the opening left by the door 20, as shown in Fig. 4. In order that the grille 50 might also be used as a warming or drying rack it is pivotally mounted so that it can be swung forwardly and downwardly into the dotted line position shown in Fig. 8. In the preferred form this pivotal mounting includes a hinge and latch means. Referring to Fig. 6, it will be there seen that the hinge means includes a transversely extending hinge pin 51 which is secured at right angles to the L-shaped bars of the grille 50, and a loop 52 of the strap metal fixed to the inturned flange of the front wall 13 in any convenient manner such as by a nut and bolt assembly 53. The grille is made to extend beyond the hinge pin 51 a distance substantially equal to the width of the flue space between the front wall 13 and the inner heating unit 10. Thus when the grille is in its horizontal position the rear portion thereof will extend across the flue space and prevent articles placed thereon from falling into the space. To hold the grille in horizontal position an L-shaped bracket 54 is fixed on the front wall of the inner heating unit 10 and against which the grille abuts. A latch member 55 is slidably mounted on one of the grille rods and has an offset finger 56 thereon. When the grille 50 has been moved to a horizontal position and is in engagement with the underside of the bracket 54, the latch member 55 is slid along the grille rod until the finger 56 slides over the bracket 54. Thus the bracket is frictionally received between the latch member and the grille rod and the grille is securely fastened in horizontal position.

I claim as my invention:

1. A space heater comprising, in combination, a heat radiating unit and an enclosing cabinet having a top wall with openings therein permitting the free passage of air therethrough, and vertical front, rear and end walls spaced from the sides of said unit to permit upward passage of air about said unit for discharge through said top wall, said top wall and one of said vertical walls having adjoining sections cut away to form an opening permitting direct exposure of an upper portion of said unit, and closure means for said opening constituting a deflector operable to direct air flowing upwardly around said portion of the unit outwardly and downwardly from the cabinet.

2. A space heater comprising, in combination, a heat radiating unit and an inclosing cabinet having a top wall with openings therein permitting the free passage of heater air therethrough, and front and end walls spaced from the sides of said unit to permit upward passage of air about said unit for discharge through said top wall openings, said top wall and said front wall having contiguous sections cut away to form an opening permitting direct exposure of the upper forward portion of said unit, and a door including angularly related sections for closing said opening, said door constituting a deflector when in open position operable to direct the flow of heated air passing by said portion of the heating unit.

HERBERT M. REEVES.

REFERENCES CITED

The following references are of record in the file of this patent:

UNITED STATES PATENTS

| Number | Name | Date |
|---|---|---|
| 1,353,743 | Graves | Sept. 21, 1920 |
| 1,667,099 | Breitenbach | Apr. 24, 1928 |
| 2,165,038 | Esson | July 14, 1939 |
| 2,205,716 | Dunham et al. | June 25, 1940 |
| 2,247,882 | Herron | July 1, 1941 |
| 2,262,261 | Smith | Nov. 11, 1941 |
| 2,318,476 | Evans et al. | May 4, 1943 |
| 2,348,127 | Grimes | May 2, 1944 |